(12) United States Patent
Thompson et al.

(10) Patent No.: US 9,630,063 B1
(45) Date of Patent: Apr. 25, 2017

(54) LIGHT-ACTIVATED ILLUMINATED GOLF BALL

(71) Applicants: Jeremy Michael Thompson, Collierville, TN (US); Jessica Anne Thompson, Collierville, TN (US)

(72) Inventors: Jeremy Michael Thompson, Collierville, TN (US); Jessica Anne Thompson, Collierville, TN (US)

( * ) Notice: Subject to any disclaimer, the term of this patent is extended or adjusted under 35 U.S.C. 154(b) by 0 days.

(21) Appl. No.: 14/618,930

(22) Filed: Feb. 10, 2015

(51) Int. Cl.
| | |
|---|---|
| *A63B 37/06* | (2006.01) |
| *A63B 43/06* | (2006.01) |
| *A63B 37/00* | (2006.01) |
| *H05B 33/08* | (2006.01) |

(52) U.S. Cl.
CPC .......... *A63B 43/06* (2013.01); *A63B 37/0003* (2013.01); *H05B 33/0854* (2013.01)

(58) Field of Classification Search
CPC .................................................... A63B 43/008
USPC ......................................................... 473/353
See application file for complete search history.

(56) References Cited

U.S. PATENT DOCUMENTS

| | | | | |
|---|---|---|---|---|
| 7,614,959 | B1* | 11/2009 | Gentile ............... | A63B 24/0021 463/30 |
| 7,785,215 | B2* | 8/2010 | Kohnen, II ........ | A63B 37/0003 473/353 |
| 8,727,918 | B1* | 5/2014 | Gentile ................ | A01K 15/025 473/570 |
| 8,727,919 | B1* | 5/2014 | Gentile .................. | A63B 43/06 473/570 |
| 2011/0244981 | A1* | 10/2011 | Schrimmer ........ | A63B 37/0003 473/353 |

* cited by examiner

*Primary Examiner* — Raeann Gorden
(74) *Attorney, Agent, or Firm* — William S. Parks

(57) ABSTRACT

A usable golf ball including an on-demand illuminating device embedded therein that is activated by exposure to external light impulses is provided. Such an illuminating device includes a photocell securely and safely positioned within the subject golf ball core in a suitable manner to allow for uniform weight displacement therein. Additionally, the device includes a switch that operates in response to light impulses wherein an initial light impulse exposure turns the photocell on and a subsequent light impulse exposure deactivates the photocell. With a properly configured illuminatable dimpled ball surface material, the resultant ball will thus illuminate on demand to permit a distinct aesthetically pleasing and/or recognizable iridescent color therefore. Such a golf ball thus includes at least one surface window structure to permit such light impulse exposure externally by the user that leads inward directly to the device switch.

7 Claims, 1 Drawing Sheet

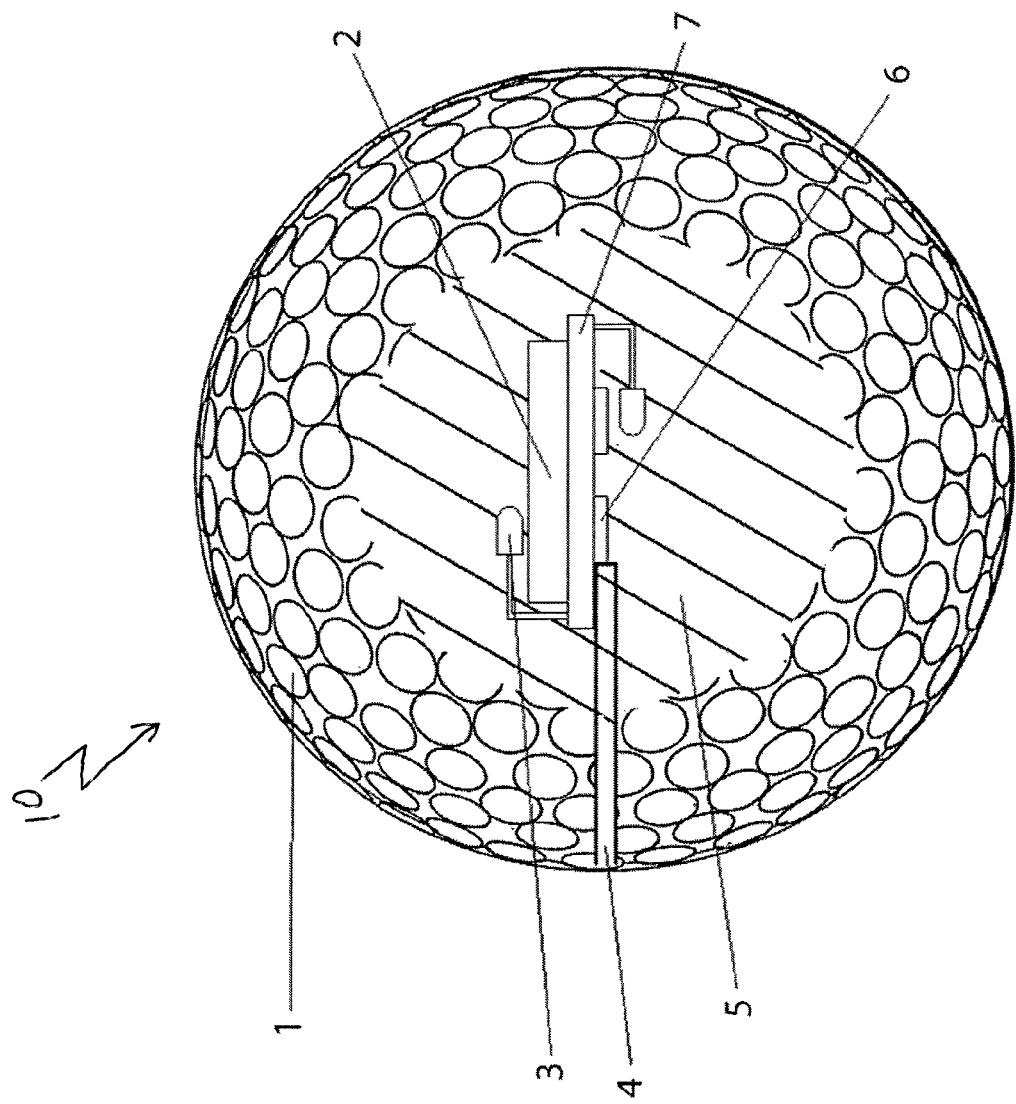

LIGHT-ACTIVATED ILLUMINATED GOLF BALL

FIELD OF THE INVENTION

The present invention pertains to a usable golf ball including an on-demand illuminating device embedded therein that is activated by exposure to external light impulses. Such an illuminating device includes a photocell securely and safely positioned within the subject golf ball core in a suitable manner to allow for uniform weight displacement therein. Additionally, the device includes a switch that operates in response to light impulses wherein an initial light impulse exposure turns the photocell on and a subsequent light impulse exposure deactivates the photocell. With a properly configured illuminatable dimpled ball surface material, the resultant ball will thus illuminate on demand to permit a distinct aesthetically pleasing and/or recognizable iridescent color therefore. Such a golf ball thus includes at least one surface window structure to permit such light impulse exposure externally by the user that leads inward directly to the device switch.

BACKGROUND OF THE PRIOR ART

Golf courses, whether long-play or miniature in configuration, have proven to be extremely popular. The competitiveness and skill required for long-play types has brought many individuals, both amateurs and professionals, to the ranks of players seeking to lower their handicaps. There exist world-renowned courses for tournament play, exhibiting not only great difficulty in actual course structure, but also notable aesthetic beauty with carefully landscaped designs. Miniature golf has proven to be an enjoyable recreation, as well, drawing numbers of players due to the typically quick and low-intensity activity involved, as well as certain locations with their own fanciful designs incorporated therein, too.

In either type of activity, there has existed a general limitation, in most situations, as to the timeframe such courses are open for play. Certainly, with low light exposure there exists great difficulty for participants to actually follow and find their struck golf balls in such situations. Photoluminescent golf balls have been employed in the past to facilitate such locating needs, particularly when the light conditions are an obstacle for such an activity, and, furthermore, when typical golf balls that have been launched off of a fairway and/or green. Many golfers have searched for such items in the rough and other locations only to find another player's ball, rather than his or her own. Other than providing static colorations (other than white) for such gold balls, the most reliable way to differentiate such golf implements is through the above-noted photoluminescence alternative. Such lighted balls thus may be provided with standard yellow, orange, or white colors for such locating purposes, or, if desired, any other type of color, specifically in a well-lit manner to facilitate locating in low-light conditions. Such previously provided golf balls, however, typically include spring-activated switches that permit activation of the luminescent devices therein upon contact with a golf club. Once struck, the lights turn on and the player can easily follow the path of the ball. Such spring-activated types, though, are limited in terms of duration of such photo luminescent results as the internal light devices, such as light emitting diode (LED) structures, are powered by temporary energy sources. The eight or so minute time length of such lit golf balls thus is noticeably short, particularly as it relates to typical timeframes between striking and finding such items during a golf round. Also, in dark conditions, the ability to activate such golf balls upon contact with a club limits the beneficial nature provided by such implements. In particular, under low light, the duffer may have difficulty viewing such a ball prior to and during a striking action. With spring-activated devices, then, the necessity for contact prior to turning on drastically limits the capability of the player to utilize such a golf ball under low-light conditions. Thus, the limited time frame coupled with the need for spring activation for photoluminescent results have proven deficient. With the need for, for example, hard surfaces for reactivation after such lighted golf balls turn off, golf courses do not usually accord the user appropriate capabilities for such purposes. The striking with a club, again, may be the only available possibility in such a milieu, thus limiting the overall effectiveness of such implements.

Improvements have been suggested, including the utilization of radio frequency tags and transmitters and receivers within and/or on such golf balls. Such devices permit a player to activate the light components externally with the utilization of a transmitter. This possible improvement, though, is susceptible to certain problems, particularly in relation to the stability of the transmitter/receiver device itself, particularly during a golf club strike (and certainly in relation to continuous activities in this nature). Additionally, the reliability of a transmitter over time to function properly with such a specific receiver may be compromised, not only due to repetitive striking activities, but in relation to the number of balls involved. With multiple golf balls typically in use during a round, a multi-signal transmitter would be necessary or such a single-signal type would activate each ball in the player's possession. Also, the ability to center a signal solely to a player's own golf ball may be a problem if the transmitter involved is set to a frequency that communicates with not only those in his or her possession, but other players' as well. The ability to control not only the time and duration of activation of such photo luminescent golf balls, with implanted devices that do not deleteriously effect the actual capability of such implements for utilization in such a capacity, and thus do not cause unevenness or other type of possible problems therein, is thus still of significant desire within this industry. The state of the art in this area is noticeably deficient, whether in terms of actual activation limitations and time duration of photo luminescent results, or in terms of providing reliable and centered control of light operations over time. The following inventive golf ball structures provide the industry with such desirable implements.

Advantages and Summary of the Invention

A distinct advantage of the present invention is the provision of a ball that is activated and/or inactivated by hand by a user through simple exposure to a light impulse at the ball surface. Thus, another advantage thereof is the ability for a user to activate such a photocell for any desired duration of time until inactivated by light impulse exposure. Another advantage is the ability to accord different lighting effects and colors through light impulse exposure to a switch in connection with a printed circuit board with a variety of possible modifications of light source results.

Accordingly, this invention encompasses a golf ball comprising a core and a dimpled translucent outer shell, said ball further including a photocell illumination component embedded within said core, said photocell illumination component further including a switch device, a printed circuit board, a power source, and at least one light source, wherein said switch activates and inactivates said power source, wherein said power source energizes said at least one light source, and wherein said printed circuit board controls the output provided by said light source; wherein said dimpled translucent outer shell is constructed of material that luminesces upon activation of said photocell illumination component within said core; wherein said switch is controlled through exposure to light impulses; wherein said dimpled translucent outer shell includes at least one window on the surface thereof, and wherein said at least one window leads to a solid light transfer shaft that connects with said switch device within said core. Such a window on the surface of said dimpled translucent may be a single window or a plurality of windows that may be connected with optical fibers as light transfer shafts. The light source is preferably, though not necessarily, light emitting diodes (LEDs) and may provide more than one coloration selection upon activation. A battery preferably provides the necessary power source, as well.

This invention further encompasses a method of illuminating such a translucent golf ball with method steps of exposing the at least one window on the surface of said dimpled outer shell to at least one light impulse, such that such a light impulse transfers through said at least one window to the light transfer shaft and to the switch allowing the switch to then activate the power source to energize the light source. In such a manner, the printed circuit board controls the output to the light source and allows for different light emissions therefrom in relation to number of duration of light impulses to which the window is exposed. Such light impulses are preferably provided as and within a directed light signal, such as signals generated via a laser, a flashlight, and any combination thereof. Furthermore, such a photocell illumination component includes a light source that provides any illuminated color to said golf ball (and thus the colors involved may be of any type, without limitation) (at least one coloration is permitted, with any number also possible).

Such an inventive golf ball thus includes a suitable translucent dimpled outer shell to effectively and outwardly provide the desired illuminated colored light effect for the ball itself during activation. Such an outer shell is typically made from a polyurethane or like polymeric material that accords sufficient strength to withstand repetitive club strikes and thus remains resilient under such continued conditions. The core of the subject golf ball is preferably a polymeric material, such as a different type of polyurethane from the translucent outer shell or other type of plastic. In such a manner, the polymeric material may be supplied in a liquid-like state and molded around the photocell illumination component housed therein. As well, such a photocell may then be suitably centered therein such a molded material that is then provided as a sphere for further attachment of the above-noted translucent outer shell. Likewise, in order to allow for the light components of the photocell to properly illuminate throughout the core to reach the translucent ball surface, the core material should also permit such transmittance of light colorations for such an effect. The outer shell and core materials will also be properly configured to allow for at least one window and at least one light transfer shaft to be aligned therein. In one embodiment, a single window at the outer shell surface may be provided (such as within a single dimple, for example, that is translucent and leads directly to the necessary light transfer shaft. Such a shaft then leads to the switch device present on the photocell. The shaft may be constructed of suitable polymeric materials for such a purpose, according light transfer capability without reflecting or refracting an external light impulse in such a manner that is does not reach the switch. Thus, a tube of cylindrical, square, triangular, oval, basically any geometric shape, may be employed in this manner and constructed of a polyurethane, polyethylene, polypropylene, basically any type of acceptable material for such light impulse transfer purposes. Alternatively, the shaft may be provided as an optical fiber that leads from the window to the switch in some manner (in any configuration, the light transfer shaft may be more than one such structure that leads consecutively until contacting the switch; the same may be utilized in terms of an optical fiber). With such an optical fiber possibility, a plurality of such fibers may be provided in radial fashion from the switch to the ball surface, thus allowing for light impulse exposure at any number of surface locations to effectuate the desired activation or deactivation of the switch on the photocell, as well. Such light transfer shafts thus are also molded around by the core and to a lesser extent the translucent outer shell surface for such a purpose. The window(s) will also be solid in construction such that only light impulses will be transferable therethrough; water and other liquids, let alone solid materials, cannot enter such light transfer conduits, thus allowing for the complete sealing of the subject gold ball from the elements. As such, even if driven into a water hazard, or other obstacle (such as a sand trap), the photocell illumination component will not be compromised and, if activated, the light sources will remain turned even if underwater or within another hazard until found and deactivated by the user (or if the power source is depleted during such a situation). Thus, with the centered photocell illumination device within the core, and the outer shell applied over such a spherical structure, the ability to provide a properly balanced golf ball with such extra components present therein is accomplished. Overall, then, all of the photocell illumination component structures are provided within the core of the ball so as to remain in a generally fixed position relative to one another to allow for continued and effective functionality and activity on demand and significant reduction in propensity for damage thereto during a club strike.

The invention thus also includes the aforementioned photocell component embedded within the subject golf ball core that allows for the desired controlled activation of illumination thereof. Such a photocell includes a power source, such as a battery or a plurality of batteries, to provide the needed energy for photocell operation. Such batteries are of the standard photocell types, such as common, button-type implements, such as 3-volt lithium cell batteries (although a single battery may be utilized rather than a plurality). As long as such a power source accords sufficient voltage to activate the light components (LEDs, for instance) during use and on demand through external light impulse exposure, such a battery would be acceptable. Since the duration of such lighted activity is indefinite, the larger the voltage, the better, certainly, to extend the lifetime of usefulness of the entire golf ball as an illuminating device. Additionally, however, although the potentially preferred power sources are permanently housed within the subject golf ball, and usually of a limited life span of utilization, if desired, external recharge capacity may be employed to extend the overall available energy supplies. However, due to the low levels of required power associated with LED lights, such batteries will provide, most likely, sufficient energy for significantly high duration of usage without any need for recharge or replacement. Certainly, with permanent placement within such a golf ball core, replacement will be difficult to accomplish. It is expected that the lifetime of the battery sources will be sufficient and will mirror the usable time frame for the subject golf balls themselves.

The photocell component will also include a printed circuit board acting in concert with the power source (batteries) to deliver the necessary signals to the light devices for illumination purposes. Such a circuit board is preferably of a particularly small profile to properly fit within the subject core with an even distribution therein and includes the necessary controls to activate the LED lights upon reception of a light impulse to the switch device. Such a small profile and centered configuration accords an even weight distribution and center of gravity for the subject golf ball, thus, as noted above, allowing for effective flight and lift as provided by standard golf balls.

The switch device therein includes a light impulse receiver that connects with an activating power source conduit. The conduit, upon activation, thus allows for the batteries to transfer energy to the circuit board, thereby generating a signal that turns on the light components. Upon receipt of a subsequent light impulse by the switch receiver, the conduit then deactivates and prevents the power transfer to the circuit board, thus turning off the light components. This capability accords the user with an on-demand manner of activating and deactivating such an illuminatable golf ball with a control that is specific to the subject ball itself. The ability to turn such lights on within the ball for a selected duration (e.g., the batteries do not stop supplying power after a certain period of time, for instance, but remain in energy supply status until deactivation through light impulse exposure is undertaken by the user) is new to the illuminatable golf ball industry as it concerns light impulse controls.

The photocell illuminatable component thus also includes at least one (and preferably at least two) light sources. Such a source is preferably, though not necessary of the LED type, particularly as such lights accord long-term duration at low energy usage levels. In any event, such LED lights are well known in the art and are generally constructed of suitable materials to effectuate the necessary illumination capability while embedded within a translucent polymeric material molded thereover. Such light sources are attached to the printed circuit board through suitably electrically conductive materials, such as connectors, wires, and the like, as would be well understood by one or ordinary skill within this art. The power source (battery) and the switch would include similar materials for such purposes, as well, again, as would be well understood. The molded material core accords the necessary levels of protection for the delicate photocell component, as well. Thus, overall, the photocell illuminatable component includes a switch that is connected through wires or other materials to control activation and deactivation of the printed circuit board and the power source attached thereto. Upon activation through exposure to a light impulse, the switch allows for the battery(ies) to transfer power to the printed circuit board to then transmit the signal to the light source(s) to illuminate. The printed circuit board may be supplied in a manner that allows for multiple types of signals to be transmitted to the light sources dependent on the light impulses received by the switch (and thus dependent upon the activation signal or signals generated thereby). Thus, for example, a quick repetitive dual impulse provided at the outer shell window(s) may indicate activation of a specific sequence of light source results (such as blinking, strobe, etc., effects), or even modification of light colors on demand. The ability to do so by the user through controlled light impulse exposure in this manner thus opens up a variety of possibilities beyond a static translucent result until deactivation is undertaken through subsequent light impulse exposure by the user.

Upon provision, then, of such a golf ball device, a user would have the ability to hold the ball or place the ball on the ground or on a tee and expose the ball at a surface window with a laser pointer, a cell phone flash light, basically any type of concentrated and directed light source, in order to activate the internal switch and illuminate the golf ball on demand. The user may then strike the golf ball and send it away and, hopefully, toward its hole destination. As it remains lit during such an action, the user may thus follow its flight and path to easily locate the same once it reaches its final placement. The distinct illuminated coloration and translucent appearance thus allows for continued recognition of the specific golf ball in such a manner, particularly in low light conditions. In contradistinction to typical spring-activated illuminated golf balls, the light-controlled devices will remain illuminated until the user exposes the ball surface window(s) to suitable deactivation light impulses, rather than relatively quick extinguishing of spring-activated types. Since most golf enthusiasts drive golf balls a distance that requires far more than 8-10 minutes of time (the typical length of illumination of spring-activated golf balls), the ability to locate an illuminated implement at his or her own pace is clearly an improvement in this industry. Likewise, as noted above, the inclusion of radio frequency tags with receivers and transmitters on and within golf balls requires a user to be within a certain distance of the subject ball for actual activation (and possible deactivation) and the frequency itself to be specific to that single subject ball. Certainly, if a user were to activate another golfer's device upon operation of a radio frequency transmitter, or to do so to other balls in his or her possession would seem to defeat the purpose of having a specific ball exhibiting on-demand activation/deactivation results. In any event, upon driving, etc., of such a golf ball, the user of the inventive device described herein may follow its trajectory easily and locate the ball as needed under certain light conditions. The outer shell and core materials impart effective beneficial protection to the photocell illumination component and the delicate structures thereof such that the illumination capability of the subject golf ball is not easily compromised due to repetitive golf activity. If desired, too, the ability to, again, have the subject ball exhibit a number of different colorations and/or lighting effects (blinking, strobe, etc.) allows for versatility for identification and location beyond that provided within the presently commercialized golf ball devices. Certainly, of course, if the user wishes to utilize the subject golf ball while unlit (and thus in a non-illuminated state), such is permitted as the golf ball will function properly and suitably as a golf ball in much the same manner as a non-illuminatable implement.

The subject golf ball is thus of any suitable size for golf play (such as a diameter of 1½ to 2 inches) and the photocell illumination component is likewise of suitable size to properly position centrally within the core thereof (thus, roughly from ¼ to ¼ inches in length).

Other features and advantages of the present invention will become apparent from the following more detailed description, taken in conjunction with the accompanying drawings, which illustrate, by way of example, the principles of the invention.

BRIEF DESCRIPTION OF THE DRAWING

The FIGURE is a cross-sectional view of a potentially preferred embodiment of an inventive light-activated illuminatable golf ball.

DETAILED DESCRIPTION OF THE DRAWING AND THE PREFERRED EMBODIMENTS

Without limitation, the following descriptions are intended to merely describe potentially preferred embodiments of the inventive golf ball implement. Other variations may be undertaken that do not nor will not affect the overall scope of protection herein.

The FIGURE shows an photo luminescent golf ball 10 that accords a user an illuminated result on demand. The ball includes a dimpled translucent outer shell 1 and an inner core 5 within which is disposed a photocell illumination component including a switch 6, a printed circuit board 7, a battery 2, and a pair of light sources (here, for example, LEDs) 3. At the outer shell surface 1 is disposed a window and light transfer shaft 4 for exposure of an external light source (not illustrated) to the switch 6. As alluded to above, such a light shaft 4 may be provided as an optical fiber, although in this embodiment such is shown as a polymeric tube that allows for light impulses to be transferred thereby from the outer shell surface 1 to the switch 6. If desired, again, a plurality of optical fibers may be employed that lead from multiple outer shell surface 1 locations to the switch 6. In such a manner, a user may simply irradiate the ball surface with a directed light source (not illustrated), such as a laser pointer, a cell phone flashlight, a standard flashlight, etc., to the outer shell surface 1 and at least one embedded optical fiber would direct the light impulse to the switch 6 for activation of the lights 3. In terms of this embodiment, then, a user would shine a light source through the window and light shaft 4 to activate the switch 6. At that point, the switch 6 indicates to the printed circuit board 7 that power is to be generated from the battery 2 to feed to the LEDs 3. Upon such activation, then, the LEDs 3 turn on and illuminate the golf ball 10 in demand. Upon subsequent exposure of a light source (not illustrated) to the window and light transfer shaft 4, the switch 6 deactivates the printed circuit board 7 and the supply of power from the battery 2 in order to extinguish the LEDs 3. As noted previously, as well, the printed circuit board 7 may be configured to receive different activation signals from the switch 6 in relation to different light impulses through the window and light transfer shaft 4 (such as, for example, quick, successive light flashes) such that the LEDs may be directed to provide any type of effect (blinking, color transfers and/or modifications, strobes, and the like) on demand. The user may then strike the ball with a club (from a tee or from the ground, for instance) and follow the path thereof during a round.

The preceding example is set forth to illustrate the principles of the invention, and specific embodiments of operation of the invention. The example is not intended to limit the scope of the method. Additional embodiments and advantages within the scope of the claimed invention will be apparent to one of ordinary skill in the art.

What is claimed is:

1. A golf ball comprising a core and a dimpled translucent outer shell, said ball further including a photocell illumination component embedded within said core, said photocell illumination component further including a switch device, a printed circuit board, a power source, and at least one light source, wherein said switch activates and inactivates said power source, wherein said power source energizes said at least one light source, and wherein said printed circuit board controls the output provided by said light source; wherein said dimpled translucent outer shell is constructed of material that luminesces upon activation of said photocell illumination component within said core; wherein said switch is controlled through exposure to light impulses; wherein said dimpled translucent outer shell includes at least one window on the surface thereof, and wherein said at least one window leads to a solid light transfer shaft that connects with said switch device within said core.

2. The golf ball of claim 1 wherein said at least one window on the surface of said dimpled translucent outer shell is a single window.

3. The golf ball of claim 1 wherein said at least one light source includes a plurality of light emitting diodes.

4. The golf ball of claim 3 wherein said plurality of light emitting diodes provide more than one coloration selection upon activation.

5. The golf ball of claim 1 wherein said power source includes at least one battery.

6. The golf ball of claim 1 wherein said at least one window is a plurality of windows on the skin surface.

7. The golf ball of claim 6 where said plurality of windows leads to said switch via a plurality of optical fibers.

* * * * *